United States Patent
Mariott et al.

(10) Patent No.: US 11,485,802 B2
(45) Date of Patent: Nov. 1, 2022

(54) SPRAY-DRIED ZIRCONOCENE CATALYST SYSTEM

(71) Applicant: Dow Global Technologies LLC, Midland, MI (US)

(72) Inventors: Wesley R. Mariott, Manvel, TX (US); Roger L. Kuhlman, Lake Jackson, TX (US); Phuong A. Cao, Middlesex, NJ (US); C. Dale Lester, South Charleston, WV (US); Chuan He, South Charleston, WV (US); Swapnil B. Chandak, Pearland, TX (US); Pradeep Jain, Missouri City, TX (US); John F. Szul, Hurricane, WV (US)

(73) Assignee: Dow Global Technologies LLC, Midland, MI (US)

( * ) Notice: Subject to any disclaimer, the term of this patent is extended or adjusted under 35 U.S.C. 154(b) by 106 days.

(21) Appl. No.: 16/971,455

(22) PCT Filed: Mar. 22, 2019

(86) PCT No.: PCT/US2019/023498
§ 371 (c)(1),
(2) Date: Aug. 20, 2020

(87) PCT Pub. No.: WO2019/190897
PCT Pub. Date: Oct. 3, 2019

(65) Prior Publication Data
US 2021/0032377 A1 Feb. 4, 2021

Related U.S. Application Data

(60) Provisional application No. 62/647,867, filed on Mar. 26, 2018.

(51) Int. Cl.
| | |
|---|---|
| *C08F 4/6592* | (2006.01) |
| *C08F 210/16* | (2006.01) |
| *C08F 110/02* | (2006.01) |
| *C08F 4/659* | (2006.01) |

(52) U.S. Cl.
CPC ...... *C08F 4/65916* (2013.01); *C08F 4/65912* (2013.01); *C08F 210/16* (2013.01)

(58) Field of Classification Search
CPC ..... C08F 4/6592; C08F 110/02; C08F 210/16
See application file for complete search history.

(56) References Cited

U.S. PATENT DOCUMENTS

| | | |
|---|---|---|
| 5,120,867 A | 6/1992 | Welborn, Jr. |
| 5,446,649 A | 8/1995 | Keum |
| 5,916,982 A | 6/1999 | Nakazawa et al. |
| 6,242,545 B1 | 6/2001 | Jejelowo et al. |
| 6,258,903 B1 | 7/2001 | Mawson et al. |
| 6,476,171 B1 | 11/2002 | Lue et al. |
| 6,689,847 B2 | 2/2004 | Mawson et al. |
| 6,982,236 B2 | 1/2006 | Wenzel et al. |
| 7,662,894 B2 | 2/2010 | Hamed et al. |
| 8,207,280 B2 | 6/2012 | Murray et al. |
| 8,247,588 B2 | 8/2012 | Agapiou et al. |
| 8,404,612 B2 | 3/2013 | Agapiou et al. |
| 8,497,330 B2 | 7/2013 | Hussein et al. |
| 9,045,569 B2 | 6/2015 | Jensen et al. |
| 2006/0293470 A1* | 12/2006 | Cao .................. C08F 10/02 526/170 |
| 2014/0288249 A1 | 9/2014 | Sun et al. |
| 2015/0232589 A1 | 8/2015 | Best et al. |
| 2017/0114199 A1 | 4/2017 | Yang et al. |

FOREIGN PATENT DOCUMENTS

| | | | |
|---|---|---|---|
| CA | 3094182 A1 * | 10/2019 | ............ C08F 210/16 |
| WO | 03102037 A1 | 12/2003 | |

OTHER PUBLICATIONS

Evonik, AEROSIL 200 nonporous hydrophilic fumed silica, Product fact sheet, <http://www.aerosil.com/product/aerosil/en/products/hydrophilic-fumed-silica/pages/default.aspx>, Retrieved May 11, 2018.

Quijada, R. et al., Study of metallocene supported on porous and nonporous silica for the polymerization of ethylene, Catalysis Letters, 1997, vol. 46, pp. 107-112.

Soga, K. et al., Activation of SiO2-supported zirconocene catalysts by common trialkylaluminums, Makromol. Chem. 1993, vol. 194, pp. 3499-3504.

Soga, K. et al., Polymerization of propene with highly isospecific SiO2-supported zirconocene catalysts activated with common alkylaluminums, Macromol. Chem. Phys. 1994, vol. 195, pp. 3347-3360.

PCT/US2019/023498, International Search Report and Written Opinion dated Jun. 19, 2019.

* cited by examiner

*Primary Examiner* — Caixia Lu

(57) ABSTRACT

A spray-dried zirconocene catalyst system comprising a zirconocene catalyst and a hydrophobic fumed silica, which supports the zirconocene catalyst. A spray-drying method of making same. Polyolefins; methods of making and using same; and articles containing same.

8 Claims, No Drawings

SPRAY-DRIED ZIRCONOCENE CATALYST SYSTEM

FIELD

Metallocene catalyst system, methods of making and using same, polyolefins and films.

INTRODUCTION

A supported metallocene catalyst system comprises a metallocene catalyst disposed on surfaces of a carrier material that is a divided inorganic solid. The supported metallocene catalyst system may be made by a concentrating method or a filtering method. These methods precipitate a metallocene catalyst either inside pores of the porous carrier material or onto the exterior surface of the nonporous carrier material. The concentrating method comprises steps of mixing a metallocene procatalyst, an activator, and the carrier material in a hydrocarbon solvent to make the metallocene catalyst in situ and give a suspension of the carrier material in a solution of the metallocene catalyst in the hydrocarbon solvent, and concentrating the suspension (removing the hydrocarbon solvent from the carrier material and metallocene catalyst) to collect the supported metallocene catalyst system. The filtering method comprises steps of mixing a metallocene procatalyst, an activator, and the carrier material in a hydrocarbon solvent to make the metallocene catalyst in situ and give a suspension of the carrier material in a solution of the metallocene catalyst in the hydrocarbon solvent, and filtering the suspension to collect the supported metallocene catalyst system.

Patents and publications in the field include U.S. Pat. Nos. 5,120,867; 5,446,649; 5,916,982; 6,242,545 B1; 6,258,903 B1; 6,476,171 B2; 6,982,236 B2; 7,662,894 B2; 8,207,280 B2; 8,247,588 B2; 8,404,612 B2; 8,497,330 B2; 9,045,569 B2; US 2006/0293470 A1; US 2015/0232589 A1; and US 2017/0114199 A1.

R. Quijada, et al. report an $EtInd_2ZrCl_2$ or $Ind_2ZrCl_2$ metallocene supported on a calcined porous silica ES-70 or EP-10 or a calcined nonporous fumed silica AEROSIL 200 (*Study of metallocene supported on porous and nonporous silica for the polymerization of ethylene*, Catalysis Letters, 1997, vol. 46, pages 107-112). The commercial ES-70 and EP-10 silicas (Crossfield Catalyst) and AEROSIL 200 silica (Evonik) are hydrophilic and were calcined prior to use with the $EtInd_2ZrCl_2$ or $Ind_2ZrCl_2$ metallocene. R. Quijada et al. made their supported metallocenes by embodiments of the filtering method.

K. Soga, et al. report activation of activated $Cp_2ZrCl_2$ metallocene supported on a calcined and then $Cl_2Si(CH_3)_2$-treated #952 $SiO_2$ (*Activation of SiO2-supported zirconocene catalysts by common trialkylaluminums*, Makromol. Chem. 1993, vol. 194, pages 3499-3504). Prior to use with the $Cp_2ZrCl_2$ metallocene, Soga et al. calcined the #952 $SiO_2$ (Fuji Davison Co., Ltd.), and then treated the resulting calcined #952 $SiO_2$ with $Cl_2Si(CH_3)_2$ to give a treated calcined silica as carrier material. Soga et al. made their supported metallocene by embodiments of the filtering method.

Commercial metallocene catalysts include XCAT™ Metallocene Catalysts HP-100 and EZ-100 from Univation Technologies, LLC. Resins produced with XCAT™ Metallocene Catalysts feature outstanding toughness, clarity and improved processability. XCAT™ Metallocene Catalysts deliver the ability to control polymer molecular structure, allowing independent manipulation of MWD, CD and long chain branching. This results in resins with excellent clarity, controllable peak melting points, lower heat seal initiation temperatures and a broad sealing range. Resins made with XCAT™ Metallocene Catalysts have narrow compositional distributions, resulting in superior toughness, high hot tack and faster line speeds.

SUMMARY

We recognized, and conceived a technical solution to, one or more of the introduced problems of: (a) how to increase catalyst activity of a supported metallocene catalyst; (b) how to narrow molecular weight distribution (MWD) of an ethylene-based polymer (e.g., an ethylene/alpha-olefin copolymer); (c) how to narrow comonomer composition distribution (CCD) of an ethylene/alpha-olefin copolymer; (d) how to increase (melt) strength of an ethylene-based polymer (e.g., an ethylene/alpha-olefin copolymer); and (e) how to improve shrinkage properties of a film of an ethylene-based polymer (e.g., an ethylene/alpha-olefin copolymer). The technical solution provides an alternative to filtered or precipitated supported metallocene catalysts.

An embodiment includes a spray-dried zirconocene catalyst system comprising a zirconocene catalyst and a hydrophobic fumed silica, which supports the zirconocene catalyst. Also included is a spray-drying method of making same.

Also included is a process for polymerizing an olefin monomer such as ethylene and, optionally, an olefin comonomer such as an alpha-olefin, with the spray-dried zirconocene catalyst system to make a polyolefin such as an ethylene-based polymer such as a polyethylene homopolymer or an ethylene/alpha-olefin copolymer. The zirconocene catalyst of the spray-dried zirconocene catalyst system may have increased catalyst productivity relative to catalyst productivity of a comparative filtered or concentrated zirconocene catalyst system that has been prepared by a filtering or concentrating method, respectively, instead of the present spray-drying method. Also included is the polyolefin made by the inventive polymerization process. Embodiments of the ethylene-based polymer may have a narrowed molecular weight distribution (MWD) and, for ethylene/alpha-olefin copolymers, a narrowed comonomer composition distribution (CCD) relative to MWD or CCD, respectively, of a comparative polyolefin made by a comparative polymerization process using the comparative filtered or concentrated zirconocene catalyst system instead of the spray-dried zirconocene catalyst system. Without wishing to be bound by theory, it is believed that embodiments of the ethylene-based polymer having a narrower MWD and/or narrower CCD may, all other things being equal, decrease optical haze and optical gloss and may increase tear strength of films made therefrom and composed thereof. Without wishing to be bound by theory, it is believed that the polyolefin such as the ethylene-based polymer may have increased melt strength and/or increased strength (solid phase), and a film thereof may have improved shrinkage properties relative to those of the comparative polyolefin or film, respectively. Additional embodiments are a method of forming films of the inventive polyolefin and the films made thereby. The inventive films are useful in many different applications. The film may be particularly useful in shrink-wrap applications.

DETAILED DESCRIPTION

Certain inventive embodiments are described below as numbered aspects for easy cross-referencing. Additional embodiments are described elsewhere herein.

Aspect 1. A spray-dried zirconocene catalyst system comprising a zirconocene catalyst and a hydrophobic fumed silica, which carries or supports the zirconocene catalyst, wherein the zirconocene catalyst of the spray-dried zirconocene catalyst system is made from a reaction of an activator and a zirconocene procatalyst of formula (I), (II), or (III): a zirconocene procatalyst of formula (I): $((R^1)_x$-cyclopentadienyl)$((R^2)_y$-cyclopentadienyl)zirconium dichloride/dibromide/dialkyl (I), wherein subscript x is an integer from 1 to 5; subscript y is an integer from 0 to 5; and each $R^1$ and $R^2$ independently is methyl, ethyl, a normal-$(C_3$-$C_{10})$alkyl (linear), or an iso-$(C_3$-$C_{10})$alkyl; or a zirconocene procatalyst of formula (II): $((R^3)_z$-(4,5,6,7-tetrahydroindenyl))$((R^2)_y$-cyclopentadienyl)zirconium dichloride/dibromide/dialkyl (II), wherein subscript z is an integer from 0 to 3; subscript y is an integer from 0 to 5; each $R^3$ is H or $R^2$; and each $R^2$ independently is methyl, ethyl, a normal-$(C_3$-$C_{10})$alkyl (linear), or an iso-$(C_3$-$C_{10})$alkyl; or a zirconocene procatalyst of formula (III): $((R^3)_z$-(4,5,6,7-tetrahydroindenyl))$((R^4)_t$-(4,5,6,7-tetrahydroindenyl))zirconium dichloride/dibromide/dialkyl (III), wherein subscript z is an integer from 0 to 3; subscript t is an integer from 0 to 3; and each $R^3$ and $R^4$ independently is H, methyl, ethyl, or a normal-$(C_3$-$C_{10})$alkyl (linear); or each of subscripts z and t independently is an integer from 1 to 3 and a first $R^3$ is in the 1-position of the 4,5,6,7-tetrahydroindenyl to which it is bonded and a first $R^4$ is in the 1-position of the 4,5,6,7-tetrahydroindenyl to which it is bonded and the first $R^3$ is covalently bonded to the first $R^4$ to form a divalent bridging group of formula $Si(R^5)_2$, wherein each $R^5$ is independently a $(C_1$-$C_3)$alkyl. The 1-position of the 4,5,6,7-tetrahydroindenyl is in the cyclopentadienyl ring where, if protonated, would become the $CH_2$ carbon atom in the 5-membered ring of 4,5,6,7-tetrahydroindene. The expression "dichloride/dibromide/dialkyl" means a dichloride, a dibromide, or a dialkyl. In some aspects the zirconocene procatalyst used in the reaction with the activator to make the zirconocene catalyst is the zirconocene procatalyst of formula (I) or (II), alternatively formula (I) or (III), alternatively formula (II) or (III), alternatively formula (I), alternatively formula (II), alternatively formula (III).

Aspect 2. The spray-dried zirconocene catalyst system of aspect 1 comprising a zirconocene catalyst and a hydrophobic fumed silica, which supports the zirconocene catalyst, wherein the zirconocene catalyst of the spray-dried zirconocene catalyst system is made from a reaction of an activator and a zirconocene procatalyst comprising the zirconocene procatalyst of formula (I): a $((R^1)_x$-cyclopentadienyl)$((R^2)_y$-cyclopentadienyl)zirconium dichloride/dibromide/dialkyl (I), wherein subscript x is an integer from 1 to 5; subscript y is an integer from 0 to 5; and each $R^1$ and $R^2$ independently is methyl, ethyl, a normal-$(C_3$-$C_{10})$alkyl (linear), or an iso-$(C_3$-$C_{10})$alkyl.

Aspect 3. The spray-dried zirconocene catalyst system of aspect 1 or 2 wherein the zirconium procatalyst is characterized by any one of limitations (i) to (x): (i) subscript x is 1 and subscript y is 0, (ii) subscripts x and y are each 1, (iii) subscript x is 1 and subscript y is 2, (iv) subscript x is 2 and subscript y is 0, (v) subscript x is 2 and subscript y is 1, (vi) subscript x is 2 and subscript y is 2, (vii) subscript x is 1 or 2 and subscript y is 0, 1 or 2, (viii) subscript x is 3 and subscript y is 1, (ix) subscript x is 4 and subscript y is 1, and (x) subscript x is an integer from 1 to 4 and subscript y is 1 or 2. When subscript y is 0, the $((R^2)_y$-cyclopentadienyl) is unsubstituted cyclopentadienyl. In some aspects subscript y is 1 or 2, alternatively y is 1, alternatively y is 2. In some aspects when $R^1$ is methyl, subscript x is 3, 4, or 5.

Aspect 4. The spray-dried zirconocene catalyst system of any one of aspects 1 to 3 wherein the zirconium procatalyst is characterized by any one of limitations (i) to (xLiii): (i) at least one of $R^1$ and $R^2$ independently is methyl; (ii) at least one of $R^1$ and $R^2$ independently is ethyl; (iii) at least one of $R^1$ and $R^2$ independently is a normal-$(C_3$-$C_{10})$alkyl (linear); (iv) at least one of $R^1$ and $R^2$ independently is an iso-$(C_3$-$C_{10})$alkyl; (v) at least one of $R^1$ independently is a normal-$(C_3$-$C_{10})$alkyl (linear) or an iso-$(C_3$-$C_{10})$alkyl and at least one of $R^2$ independently is a normal-$(C_3$-$C_{10})$alkyl (linear) or an iso-$(C_3$-$C_{10})$alkyl; (vi) at least one of $R^1$ independently is a normal-$(C_3$-$C_{10})$alkyl (linear) and at least one of $R^2$ independently is a normal-$(C_3$-$C_{10})$alkyl (linear); (vii) at least one of $R^1$ independently is an iso-$(C_3$-$C_{10})$alkyl and at least one of $R^2$ independently is an iso-$(C_3$-$C_{10})$alkyl; (viii) the $((R^1)_x$-cyclopentadienyl) and the $((R^2)_y$-cyclopentadienyl) are different (e.g., one is propylcyclopentadienyl and the other is cyclopentadienyl or methylcyclopentadienyl); (ix) the $((R^1)_x$-cyclopentadienyl) and the $((R^2)_y$-cyclopentadienyl) are the same (e.g., both are propylcyclopentadienyl); (x) subscripts x and y are each 1 and each of $R^1$ and $R^2$ is the same; (xi) subscripts x and y are each 1 and each of $R^1$ and $R^2$ is a same normal-$(C_3$-$C_{10})$alkyl; (xii) subscripts x and y are each 1 and each of $R^1$ and $R^2$ is a same normal-$(C_3$-$C_4)$alkyl; (xiii) subscripts x and y are each 1 and each of $R^1$ and $R^2$ is propyl; (xiv) the dichloride/dibromide/dialkyl is a dichloride or a dibromide, alternatively a dichloride; (xv) the dichloride/dibromide/dialkyl is a dialkyl, wherein each alkyl independently is a $(C_1$-$C_{10})$alkyl, alternatively a $(C_2$-$C_{10})$alkyl, alternatively a $(C_1$-$C_4)$alkyl, alternatively a $(C_2$-$C_6)$alkyl; (xvi) the dichloride/dibromide/dialkyl is a dialkyl and each alkyl independently is selected from methyl, ethyl, 1-methylethyl, propyl, butyl, 1-methylpropyl, and 2-methylpropyl; (xvii) the dichloride/dibromide/dialkyl is a dialkyl and each alkyl independently is selected from methyl, ethyl, propyl, and butyl; (xviii) the dichloride/dibromide/dialkyl is a dialkyl and each alkyl independently is selected from methyl, ethyl, and propyl; (xix) the dichloride/dibromide/dialkyl is a dialkyl and each alkyl independently is selected from methyl and propyl; (xx) the dichloride/dibromide/dialkyl is a dialkyl and each alkyl independently is selected from methyl and ethyl; (xxi) the dichloride/dibromide/dialkyl is a dialkyl and each alkyl is methyl; (xxii) the dichloride/dibromide/dialkyl is a dialkyl and each alkyl is ethyl; (xxiii) both (i) and any one of (xiv) to (xxii); (xxiv) both (ii) and any one of (xiv) to (xxii); (xxv) both (iii) and any one of (xiv) to (xxii); (xxvi) both (iv) and any one of (xiv) to (xxii); (xxvii) both (v) and any one of (xiv) to (xxii); (xxviii) both (vi) and any one of (xiv) to (xxii); (xxix) both (vii) and any one of (xiv) to (xxii); (xxx) both (viii) and any one of (xiv) to (xxii); (xxxi) both (ix) and any one of (xiv) to (xxii); (xxxii) both (x) and any one of (xiv) to (xxii); (xxxiii) both (xi) and any one of (xiv) to (xxii); (xxxiv) both (xii) and any one of (xiv) to (xxii); (xxxv) both (xiii) and any one of (xiv) to (xxii); (xxxvi) the zirconium procatalyst is the $((R^1)_x$-cyclopentadienyl)$((R^2)_y$-cyclopentadienyl)zirconium dichloride/dibromide/dialkyl selected from (tetramethylcyclopentadienyl)(n-propylcyclopentadienyl)zirconium dichloride/dibromide/dialkyl; (tetramethylcyclopentadienyl)(n-propylcyclopentadienyl)zirconium dichloride; (tetramethylcyclopentadienyl)(n-propylcyclopentadienyl)zirconium dibromide; (tetramethylcyclopentadienyl)(n-propylcyclopentadienyl)zirconium dimethyl; bis(butylcyclopentadienyl)zirconium dichloride, bis(butylcyclopentadienyl)zirconium dibromide, bis(butylcyclopentadienyl)zirconium dimethyl, and bis(butylcyclopentadienyl)zirconium diethyl; (xxxvii) the $((R^1)$ $_x$-cyclopentadienyl)((R$^2$)$_y$-cyclopentadienyl)zirconium dichloride/dibromide/dialkyl is bis(butylcyclopentadienyl)zirconium dichloride; (xxxviii) the ((R$^1$)$_x$-cyclopentadienyl)((R$^2$)$_y$-cyclopentadienyl)zirconium dichloride/dibromide/dialkyl is bis(butylcyclopentadienyl)zirconium dimethyl; and (xxxix) the ((R$^1$)$_x$-cyclopentadienyl)((R$^2$)$_y$-cyclopentadienyl)zirconium dichloride/dibromide/dialkyl is bis(butylcyclopentadienyl)zirconium diethyl; (xL) the ((R$^1$)$_x$-cyclopentadienyl)((R$^2$)$_y$-cyclopentadienyl)zirconium dichloride/dibromide/dialkyl is selected from bis(1-methyl-3-butylcyclopentadienyl)zirconium dichloride, bis(1-methyl-3-butylcyclopentadienyl)zirconium dibromide, bis(1-methyl-3-butylcyclopentadienyl)zirconium dimethyl, and bis(1-methyl-3-butylcyclopentadienyl)zirconium diethyl; (xLi) the ((R$^1$)$_x$-cyclopentadienyl)((R$^2$)$_y$-cyclopentadienyl)zirconium dichloride/dibromide/dialkyl is bis(1-methyl-3-butylcyclopentadienyl)zirconium dichloride; (xLii) the ((R$^1$)$_x$-cyclopentadienyl)((R$^2$)$_y$-cyclopentadienyl)zirconium dichloride/dibromide/dialkyl is bis(1-methyl-3-butylcyclopentadienyl)zirconium dimethyl; and (xLiii) the ((R$^1$)$_x$-cyclopentadienyl)((R$^2$)$_y$-cyclopentadienyl)zirconium dichloride/dibromide/dialkyl is bis(1-methyl-3-butylcyclopentadienyl)zirconium diethyl. Alternatively, subscript x is an integer from 1 to 4, subscript y is 1, R$^1$ is methyl, and R$^2$ is ethyl, propyl, or butyl. The zirconium dimethyl procatalysts are preferred over the zirconium diethyl procatalysts.

Aspect 5. The spray-dried zirconocene catalyst system of aspect 1 comprising a zirconocene catalyst and a hydrophobic fumed silica, which supports the zirconocene catalyst, wherein the zirconocene catalyst of the spray-dried zirconocene catalyst system is made from a reaction of an activator and a zirconocene procatalyst comprising the zirconocene procatalyst of formula (III): ((R$^3$)$_z$-(4,5,6,7-tetrahydroindenyl))((R$^4$)$_t$-(4,5,6,7-tetrahydroindenyl))zirconium dichloride/dibromide/dialkyl (III), wherein subscript z is an integer from 0 to 3; subscript t is an integer from 0 to 3; and each R$^3$ and R$^4$ independently is H, methyl, ethyl, or a normal-(C$_3$-C$_{10}$)alkyl (linear); or each of subscripts z and t independently is an integer from 1 to 3 and a first R$^3$ is in the 1-position of the 4,5,6,7-tetrahydroindenyl to which it is bonded and a first R$^4$ is in the 1-position of the 4,5,6,7-tetrahydroindenyl to which it is bonded and the first R$^3$ is covalently bonded to the first R$^4$ to form a divalent bridging group of formula Si(R$^5$)$_2$, wherein each R$^5$ is independently a (C$_1$-C$_3$)alkyl.

Aspect 6. The spray-dried zirconocene catalyst system of aspect 5 wherein each of subscripts z and t is 1 and a first (and only) R$^3$ is in the 1-position of the 4,5,6,7-tetrahydroindenyl to which it is bonded and first (and only) R$^4$ is in the 1-position of the 4,5,6,7-tetrahydroindenyl to which it is bonded and the first R$^3$ is covalently bonded to the first R$^4$ to form the divalent bridging group of formula Si(R$^5$)$_2$, wherein each R$^5$ is methyl. To remove all doubt, the 4,5,6,7-tetrahydroindenyl bonded to the first R$^3$ and the 4,5,6,7-tetrahydroindenyl bonded to the first R$^4$ are different. The zirconocene procatalyst of formula (III) of this aspect is named herein dimethyl-1,1'-silanylene-bridged bis(4,5,6,7-tetrahydroindenyl)zirconium dichloride/dibromide/dialkyl. In some aspects the zirconocene procatalyst of formula (III) of this aspect is dimethyl-1,1'-silanylene-bridged bis(4,5,6,7-tetrahydroindenyl)zirconium dichloride, alternatively dimethyl-1,1'-silanylene-bridged bis(4,5,6,7-tetrahydroindenyl)zirconium dibromide, dimethyl-1,1'-silanylene-bridged bis(4,5,6,7-tetrahydroindenyl)zirconium dialkyl, alternatively dimethyl-1,1'-silanylene-bridged bis(4,5,6,7-tetrahydroindenyl)zirconium dimethyl.

Aspect 7. The spray-dried zirconocene catalyst system of any one of aspects 1 to 6 made by mixing the activator, the zirconocene procatalyst, and the hydrophobic fumed silica in a hydrocarbon solvent to make a suspension of the hydrophobic fumed silica in a solution of the zirconocene catalyst, which is made in situ, in the hydrocarbon solvent; and spray-drying the suspension to give the spray-dried zirconocene catalyst system.

Aspect 8. The spray-dried zirconocene catalyst system of any one of aspects 1 to 7 wherein the hydrophobic fumed silica is made by contacting an untreated fumed silica, having surfaces containing silicon-bonded hydroxyl groups (SiOH groups), with a silicon-based hydrophobing agent, containing on average per molecule one or more functional groups reactive with a SiOH group, to give the hydrophobic fumed silica. The untreated fumed silica may be uncalcined. The silicon-based hydrophobing agent may be selected from $(CH_3)_2SiCl_2$, a polydimethylsiloxane, hexamethyldisilazane (HMDZ), and a $(C_1-C_{10})$alkylSi$((C_1-C_{10})$alkoxy$)_3$ (e.g., an octyltrialkoxysilane such as octyltriethoxysilane, i.e., $CH_3(CH_2)_7Si(OCH_2CH_3)_3$).

Aspect 9. The spray-dried zirconocene catalyst system of any one of aspects 1 to 8 wherein the activator is an alkylaluminum, an alkylaluminoxane, or a combination thereof. The activator may be a methylaluminoxane.

Aspect 10. The spray-dried zirconocene catalyst system of any one of aspects 1 to 9 further comprising any one of limitations (i) to (vii): (i) an olefin monomer (e.g., ethylene) or alpha-olefin; (ii) a polyolefin; (iii) a metal carboxylate salt, wherein the metal carboxylate salt is represented by the formula: $MQ_m(O_2CR)_n$, wherein M is a metal atom of Group 2 or Group 13 of the Periodic table of Elements; Q is a halogen, hydroxy, alkyl, alkoxy, aryloxy, siloxy, silane, or sulfonate group; R is a $(C_5-C_{30})$hydrocarbyl; subscript m is an integer from 0 to 3; subscript n is an integer from 1 to 4; and the sum of subscripts m and n is equal to the valence of M; and (iv) both (i) and (ii); (v) both (i) and (iii); (vi) both (ii) and (iii); and (vii) each of (i) to (iii). In some aspects M is a metal atom of Group 2, alternatively Mg or Ca, alternatively Mg, alternatively Ca, alternatively a metal atom of Group 13, alternatively B or Al, alternatively B, alternatively Al. In some aspects Q is a halogen; alternatively hydroxy; alternatively alkyl, alkoxy, or aryloxy; alternatively alkyl; alternatively alkoxy; alternatively aryloxy; alternatively siloxy or silane; alternatively siloxy; alternatively silane; alternatively sulfonate group. In some aspects subscript m is an integer from 0 to 2, alternatively 1 to 3, alternatively 1 or 2, alternatively 2 or 3, alternatively 0, alternatively 1, alternatively 2, alternatively 3. In some aspects subscript n is an integer from 1 to 3, alternatively 2 to 4, alternatively 1 or 2, alternatively 3 or 4, alternatively 1, alternatively 2, alternatively 3, alternatively 4. In some aspects the sum of subscripts m and n is equal to the valence of M which is equal to 2, alternatively 3. The spray-dried zirconocene catalyst system further comprising a polyolefin may be used as a seed bed in a gas-phase polymerization reactor and process.

Aspect 11. A method of making a spray-dried zirconocene catalyst system, the method comprising contacting in a hydrocarbon solvent an activator with a zirconocene procatalyst as defined in any one of aspects 1 to 10, and a hydrophobic fumed silica, and, optionally, a metal carboxylate salt of the formula: $MQ_m(O_2CR)_n$, wherein M, Q, R, subscript m and subscript n are as defined in aspect 10, to give a suspension of the hydrophobic fumed silica in a solution of the zirconocene catalyst, which is made in situ, in the hydrocarbon solvent, and then spray-drying the suspension to give the spray-dried zirconocene catalyst system. The spray-dried zirconocene catalyst system made by the method may be that of any one of aspects 1 to 10. The contacting of the activator with the zirconocene procatalyst includes contacting the zirconocene procatalyst with the activator. The contacting step and in situ making of the zirconocene catalyst may be run under an inert gas atmosphere and in the absence or presence of the hydrophobic fumed silica to make the solution of the zirconocene catalyst in the hydrocarbon solvent. In method embodiments wherein the contacting step is run in the absence of the hydrophobic fumed silica, the method further comprises contacting the solution with the hydrophobic fumed silica to make the suspension. The contacting the solution with the hydrophobic fumed silica includes contacting the hydrophobic fumed silica with the solution. In method embodiments wherein the contacting step is run in the presence of the hydrophobic fumed silica, the contacting step may comprise contacting the activator with a mixture of the hydrophobic fumed silica and the zirconocene procatalyst in the hydrocarbon solvent; alternatively contacting the zirconocene procatalyst with a mixture of the hydrophobic fumed silica and the activator in the hydrocarbon solvent. The hydrocarbon solvent may be a saturated and/or aromatic hydrocarbon solvent, such as an alkane; a mixture of two or more alkanes; a mineral oil; an alkyl-substituted benzene such as toluene, ethylbenzene, or xylenes; or a mixture of any two or more thereof.

Aspect 12. A method of making a polyethylene composition, the method comprising contacting ethylene (monomer) and optionally zero, one, or more ($C_3$-$C_{20}$)alpha-olefin (comonomer(s)) with the spray-dried zirconocene catalyst system of any one of aspects 1 to 10 or that made by the method of aspect 11 in a polymerization reactor to generate a polymerization reaction giving a polyethylene composition comprising a polyethylene homopolymer or ethylene/($C_3$-$C_{20}$)alpha-olefin copolymer, respectively, and the spray-dried zirconocene catalyst system, or a by-product thereof. Without wishing to be bound by theory, it is believed that the spray-dried zirconocene catalyst functions in the method to enhance or increase the rate of polymerization of monomer and/or any comonomer(s). In some aspects the method further comprises adding molecular hydrogen ($H_2$) from an external source (outside the reactor) into the polymerization reactor, such as for controlling a property, e.g., $I_2$, of the product polyethylene homopolymer or ethylene/($C_3$-$C_{20}$) alpha-olefin copolymer. The polymerization reaction is conducted during the contacting step and under effective polymerization conditions. The polymerization reaction may be conducted in a gas phase or a liquid-phase. The liquid-phase may be a slurry phase or solution phase. In some aspects the method comprises copolymerizing ethylene and one or more ($C_3$-$C_{20}$)alpha-olefin (comonomer(s)) to give the ethylene/($C_3$-$C_{20}$)alpha-olefin copolymer composition, alternatively the method comprises copolymerizing ethylene and one or more ($C_4$-$C_8$)alpha-olefin (comonomer(s)) to give the ethylene/($C_4$-$C_8$)alpha-olefin copolymer composition. The ($C_3$-$C_{20}$)alpha-olefin-derived comonomeric constituent units and the ($C_4$-$C_8$)alpha-olefin-derived comonomeric constituent units may be derived from 1-butene; alternatively 1-hexene; alternatively 1-octene; alternatively a combination of any two thereof. In some aspects the method is free of any olefin polymerization catalyst other than the spray-dried zirconocene catalyst system. The method may comprise a gas phase polymerization optionally in the presence of added external molecular hydrogen gas ($H_2$), optionally in the presence of an induced condensing agent (ICA); and in one, two or more gas phase polymerization reactors under (co)polymerizing conditions, thereby making the polyethylene composition; wherein the (co)polymerizing conditions comprise a reaction temperature from 70 degrees (°) to 110° Celsius (C.), alternatively 80° to 110° C.; a molar ratio of the molecular hydrogen gas to the ethylene ($H_2/C_2$ molar ratio) from >0 to 0.1, alternatively from 0.0001 to 0.0050; and a molar ratio of the comonomer to the ethylene (Comonomer/$C_2$ molar ratio, i.e., $C_x/C_2$ molar ratio, e.g., $C_6/C_2$ molar ratio) from 0.0001 to 0.10, alternatively 0.005 to 0.10, alternatively 0.15 to 0.050, alternatively 0.020 to 0.039.

Aspect 13. A polyethylene composition made by the method of aspect 12. The polyethylene composition may be an ethylene-based polymer, which may be a polyethylene homopolymer or an ethylene/($C_3$-$C_{20}$)alpha-olefin copolymer.

Aspect 14. A manufactured article comprising a shaped form of the polyethylene composition of aspect 13. The manufactured article may be selected from: coatings, films, sheets, extruded articles, and injection molded articles. The manufactured article may be a coating layer (e.g., of a coated article), pipe, film (e.g., blown film), agricultural film, food packaging, garment bags, grocery bags, heavy-duty sacks, industrial sheeting, pallet and shrink wraps, bags, buckets, freezer containers, lids, and toys.

Aspect 15. A film comprising the polyethylene composition of aspect 13.

The zirconocene catalyst of the spray-dried zirconocene catalyst system may have a higher catalyst productivity than a comparative spray-dried zirconocene catalyst system prepared using a hydrophilic silica, which is porous, instead of the hydrophobic fumed silica, which is non-porous. Embodiments of the polyolefin such as the ethylene-based polymer made by the inventive polymerization process may have a narrower molecular weight distribution and, for ethylene/alpha-olefin copolymers a narrower comonomer composition distribution, than those of a comparative polyolefin made in a comparative polymerization process and reactor using the comparative spray-dried zirconocene catalyst system instead of the inventive spray-dried zirconocene catalyst system.

The manufactured article may be a film comprising, alternatively consisting essentially of, alternatively consisting of the polyethylene composition. The inventive film made from the polyolefin may have improved properties such as improved (decreased) optical haze, improved (decreased) optical gloss, improved (increased) tear strength, improved shrinkage properties, or a combination of any two or more thereof. Improved shrinkage means the increased ability of molecules of the polyolefin in the film to shrink or recoil when a small amount of heat (e.g., heated air) is applied. The greater the shrinkage under a given amount of applied heat, the more improved the shrinkage. This characteristic of the inventive polymers enables their use in shrink wrap applications, also known as collation shrink applications. Such applications include bundling beverage bottles into multipacks. Without wishing to be bound by theory, it is believed that the inventive polyolefin, formed (e.g., blown) into a film, is in stretched state. When a small amount of heat is applied to the film, it will "recoil", which results in the film shrinking. Long chain branching in the inventive polyolefin or a high molecular weight tail in its molecular weight distribution (Mw/Mn) are desired molecular architecture attributes for improving shrinkage.

The spray-dried zirconocene catalyst system may be free of a finely-divided solid other than the hydrophobic fumed silica or the zirconocene catalyst. For example, the spray-dried zirconocene catalyst system may be free of a support material such as $MgCl_2$ and free of a carrier material such as an alumina, clay, or untreated silica. Alternatively, the spray-dried zirconocene catalyst system may further comprise a finely-divided solid that is a support material such as $MgCl_2$ and/or a carrier material such as an alumina, clay, or untreated silica.

In some embodiments the spray-dried zirconocene catalyst system and method of polymerization may further comprise a hafnocene catalyst, e.g., a bis(propylcyclopentadienyl)hafnium dihalide. Alternatively, the spray-dried zirconocene catalyst system and method of polymerization may be free of hafnium.

Alkyl: a monovalent radical of a saturated hydrocarbon, which may be straight chain, branched chain, or cyclic. Normal-$(C_3$-$C_{10})$alkyl (linear) includes propyl, butyl, pentyl, hexyl, heptyl, octyl, nonyl, and decyl and is an alkyl of formula —$(CH_2)_q CH_3$, wherein subscript q is an integer from 2 to 9, respectively.

Carrier material: a porous particulate solid having pores and surfaces suitable for carrying a catalyst.

Composition: a chemical composition. Arrangement, type and ratio of atoms in molecules and type and relative amounts of molecules in a substance or material.

Compound: a molecule or collection of molecules.

Concentrating: a method of slowly increasing the mass or molar amount of less volatile chemical constituent(s) per unit volume of a continuous mixture comprising more volatile and less volatile chemical constituent(s) by gradually removing the more volatile chemical constituent(s) from the less volatile constituent(s) of the continuous mixture to give a concentrate having a higher mass or molar amount of the less volatile chemical constituent(s) per unit volume than did the continuous mixture, wherein the rate of gradual removing is limited by a relatively small evaporative surface area to mass ratio (compared to spray-drying). The concentrate may be a precipitated solid.

Consisting essentially of, consist(s) essentially of, and the like. Partially-closed ended expressions that exclude anything that would affect the basic and novel characteristics of that which they describe, but otherwise allow anything else.

Consisting of and consists of. Closed ended expressions that exclude anything that is not specifically described by the limitation that it modifies. In some aspects any one, alternatively each expression "consisting essentially of" or "consists essentially of" may be replaced by the expression "consisting of" or "consists of", respectively.

Dry. Anhydrous. A moisture content from 0 to less than 5 parts per million based on total parts by weight. Materials fed to the reactor(s) during a polymerization reaction are dry.

Effective amount: quantity sufficient to achieve an appreciable beneficial result.

Feeds. Quantities of reactants and/or reagents that are added or "fed" into a reactor. In continuous polymerization operation, each feed independently may be continuous or intermittent. The quantities or "feeds" may be measured, e.g., by metering, to control amounts and relative amounts of the various reactants and reagents in the reactor at any given time.

Film: claimed film properties are measured on 25 micrometers thick monolayer films.

Fumed silica, hydrophobic pre-treated (i.e., hydrophobic fumed silica): a reaction product of contacting an untreated fumed silica with a hydrophobing agent to react with surface hydroxyl groups on the untreated fumed silica, thereby modifying the surface chemistry of the fumed silica to give a hydrophobic pre-treated fumed silica. The hydrophobing agent may be silicon based.

Fumed silica, untreated (hydrophilic fumed silica): pyrogenic silica produced in a flame. An amorphous silica powder made by fusing microscopic droplets into branched, chainlike, three-dimensional secondary particles, which agglomerate into tertiary particles. Not quartz.

Hydrophobing agent: an organic or organosilicon compound that forms a stable reaction product with surface hydroxyl groups of fumed silica.

Induced condensing agent (ICA): An inert liquid useful for cooling materials in gas phase polymerization reactor(s) (e.g., a fluidized bed reactor).

Inert: Generally, not (appreciably) reactive or not (appreciably) interfering therewith in the inventive polymerization reaction. The term "inert" as applied to the purge gas or ethylene feed means a molecular oxygen ($O_2$) content from 0 to less than 5 parts per million based on total parts by weight of the purge gas or ethylene feed.

Modifier: a composition that alters reactivity, stability, or both of a substance on which the composition acts.

Polyethylene: A macromolecule, or collection of macromolecules, composed of constitutional units wherein 50 to 100 mole percent (mol %), alternatively 70 to 100 mol %, alternatively 80 to 100 mol %, alternatively 90 to 100 mol %, alternatively 95 to 100 mol %, alternatively any one of the foregoing ranges wherein the upper endpoint is <100 mol %, of such constitutional units are derived from ethylene monomer; and, in aspects wherein there are less than 100 mol % ethylenic constitutional units, the remaining constitutional units are comonomeric units derived from at least one $(C_3$-$C_{20})$alpha-olefin; or collection of such macromolecules.

(Pro)catalyst: a procatalyst and/or catalyst.

Quartz: an untreated, nonporous crystalline form of silicon dioxide. Particulate or bulk.

Silica. A particulate form of silicon dioxide that may be amorphous, crystalline, or gel-like. Includes fused quartz, fumed silica, silica gel, and silica aerogel.

Spray-drying: rapidly forming a particulate solid comprising less volatile chemical constituents via aspiration of a bulk mixture of the less volatile chemical constituents and more volatile chemical constituents through a nebulizer using a hot gas, wherein the aspiration forms particulates collectively having a relatively large evaporative surface area to mass ratio compared to that of concentrating. The particle size and shape of the particulate solid formed by spray-drying may be different than those of a precipitated solid.

Support material: a non-porous particulate solid for hosting on its surfaces a catalyst.

System (chemical): an interrelated arrangement of different chemical constituents so as to form a functioning whole.

Transport: movement from place to place. Includes from reactor to reactor, tank to reactor, reactor to tank, and manufacturing plant to storage facility and vice versa.

Alkylaluminoxane: also referred to as alkylalumoxane. A product of a partial hydrolysis of a trialkylaluminum compound. The alkylaluminoxane may be a $(C_1$-$C_{10})$alkylaluminoxane, alternatively a $(C_1$-$C_6)$alkylaluminoxane, alternatively a $(C_1$-$C_4)$alkylaluminoxane, alternatively a $(C_1$-$C_3)$alkylaluminoxane, alternatively a $(C_1$-$C_2)$alkylaluminoxane, alternatively a methylaluminoxane (MAO), alternatively a modified-methylaluminoxane (MMAO). In some aspects the alkylaluminoxane is a MAO. In some embodiments the alkylaluminoxane is supported on untreated silica, such as untreated fumed silica. The alkylaluminoxane may be obtained from a commercial supplier or prepared by any suitable method. Suitable methods for preparing alkylaluminoxanes are well-known. Examples of such preparation methods are described in U.S. Pat. Nos. 4,665,208; 4,952,540; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031; 5,391,793; 5,391,529; and 5,693,838; and in European publications EP-A-0 561 476; EP-B1-0 279 586; and EP-A-0 594-218; and in PCT publication WO 94/10180.

$(C_3$-$C_{20})$alpha-olefin. A compound of formula: $H_2C=C(H)$—R, wherein R is a straight chain $(C_1$-$C_{18})$alkyl group. $(C_1$-$C_{18})$alkyl group is a monovalent unsubstituted saturated hydrocarbon having from 1 to 18 carbon atoms. Examples of R are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl. In some embodiments the $(C_3$-$C_{20})$alpha-olefin is 1-propene, 1-butene, 1-hexene, or 1-octene; alternatively 1-butene, 1-hexene, or 1-octene; alternatively 1-butene or 1-hexene; alternatively 1-butene or 1-octene; alternatively 1-hexene or 1-octene; alternatively 1-butene; alternatively 1-hexene; alternatively 1-octene; alternatively a combination of any two of 1-butene, 1-hexene, and 1-octene.

Carrier material. The carrier material may be untreated or treated with a hydrophobing agent. The untreated carrier material may be a porous untreated silica and have variable surface area, pore volume, and average particle size. Each of the above properties are measured using conventional techniques known in the art. The untreated silica may be amorphous silica (not quartz), alternatively a high surface area amorphous silica (e.g., from 500 to 1000 m$^2$/g), alternatively a high surface area fumed silica. Such silicas are commercially available from a number of sources. The silica may be in the form of spherical particles, which are obtained by a spray-drying process. The untreated silica may be calcined (i.e., dehydrated) or not calcined. The treated carrier material is made by treating an untreated carrier material with the hydrophobing agent. The treated carrier material may have different surface chemistry properties and/or dimensions than the untreated carrier material.

Ethylene: a compound of formula $H_2C=CH_2$.

$((R^1)_x$-cyclopentadienyl)$((R^2)_y$-cyclopentadienyl)zirconium dichloride/dibromide/dialkyl. A $((R^1)_x$-cyclopentadienyl)$((R^2)_y$-cyclopentadienyl)zirconium dichloride, $((R^1)_x$-cyclopentadienyl)$((R^2)_y$-cyclopentadienyl)zirconium dibromide, or $((R^1)_x$-cyclopentadienyl)$((R^2)_y$-cyclopentadienyl)zirconium dialkyl. The $((R^1)_x$-cyclopentadienyl)$((R^2)_y$-cyclopentadienyl)zirconium dichloride/dibromide/dialkyl may be prepared by any suitable method such as that described in U.S. Pat. No. 6,242,545 B1 and the US patents, EP publications, and PCT publications referenced in column 3, at lines 48 to 60. In some embodiments the $((R^1)_x$-cyclopentadienyl)$((R^2)_y$-cyclopentadienyl)zirconium dichloride/dibromide/dialkyl may be obtained from a commercial source. In other embodiments the $((R^1)_x$-cyclopentadienyl)$((R^2)_y$-cyclopentadienyl)zirconium dichloride/dibromide/dialkyl may be synthesized according to any suitable method.

Synthesis of dialkylsilanylene-bridged zirconium procatalysts of formula (III) are known. For example, the dimethyl-1,1'-silanylene-bridged bis(4,5,6,7-tetrahydroindenyl)zirconium dichloride may be synthesized by platinum-catalyzed hydrogenation of dimethyl-1,1'-silanylene-bridged bis(indenyl)zirconium dichloride.

Hydrophobing agent, silicon-based: an organosilicon compound that forms a stable reaction product with surface hydroxyl groups of a fumed silica. The organosilicon compound may be a polydiorganosiloxane compound or an organosilicon monomer, which contains silicon bonded leaving groups (e.g., Si-halogen, Si-acetoxy, Si-oximo (Si—ON=C<), Si-alkoxy, or Si-amino groups) that react with surface hydroxyl groups of untreated fumed silica to form Si—O—Si linkages with loss of water molecule as a by-product. The polydiorganosiloxane compound, such as a polydimethylsiloxane, contains backbone Si—O—Si groups wherein the oxygen atom can form a stable hydrogen bond to a surface hydroxyl group of fumed silica. The silicon-based hydrophobing agent may be trimethylsilyl chloride, dimethyldichlorosilane, a polydimethylsiloxane fluid, hexamethyldisilazane, an octyltrialkoxysilane (e.g., octyltrimethoxysilane), and a combination of any two or more thereof.

Induced condensing agent or ICA. In some aspects the ICA is a $(C_5$-$C_{20})$alkane, alternatively a $(C_{11}$-$C_{20})$alkane, alternatively a $(C_5$-$C_{10})$alkane. In some aspects the ICA is a $(C_5$-$C_{10})$alkane. In some aspects the $(C_5$-$C_{10})$alkane is a pentane, e.g., normal-pentane or isopentane; a hexane; a heptane; an octane; a nonane; a decane; or a combination of any two or more thereof. In some aspects the ICA is isopentane (i.e., 2-methylbutane). The inventive method of polymerization, which uses the ICA, may be referred to herein as being an inert condensing mode operation (ICMO). Concentration in gas phase measured using gas chromatography by calibrating peak area percent to mole percent (mol %) with a gas mixture standard of known concentrations of ad rem gas phase components. Concentration may be from 1 to 10 mol %, alternatively from 3 to 8 mole %. The use of ICA is optional. In some aspects, including some of the inventive examples described later, an ICA is used. For example, in aspects of the method of making a mixture of ICA and catalyst may be fed into a polymerization reactor. In other aspects of the method, use of ICA may be omitted, and a mixed pre-formulated dry catalyst may be fed as such into the polymerization reactor, which lacks ICA.

Mono- or di-$(C_1$-$C_4)$alkyl-containing aluminum compound. In any one of the foregoing embodiments a mono- or di-$(C_1$-$C_4)$alkyl-containing aluminum compound may be used in place of, alternatively in combination with, the trialkylaluminum. The mono- or di-$(C_1$-$C_4)$alkyl-containing aluminum compound may independently contain 1 or 2 $(C_1$-$C_4)$alkyl groups, respectively, and 2 or 1 groups each independently selected from chloride atom and $(C_1$-$C_4)$ alkoxide. Each $(C_1$-$C_4)$alkyl may independently be methyl; ethyl; propyl; 1-methylethyl; butyl; 1-methylpropyl; 2-methylpropyl; or 1,1-dimethylethyl. Each $(C_1$-$C_4)$alkoxide may independently be methoxide; ethoxide; propoxide; 1-methylethoxide; butoxide; 1-methylpropoxide; 2-methylpropoxide; or 1,1-dimethylethoxide. The mono- or di-$(C_1$-$C_4)$alkyl-containing aluminum compound may be diethylaluminum chloride (DEAC), diethylaluminum ethoxide (DEAE), ethylaluminum dichloride (EADC), or a combination or mixture of any two or more thereof.

Trialkylaluminum: a compound of formula $((C_1$-$C_{10})$alkyl$)_3$Al, wherein each $(C_1$-$C_{10})$alkyl group is independently selected. The trialkylaluminum may be trimethylaluminum, triethylaluminum ("TEAl"), tripropylaluminum, tris (1-methylethyl)aluminum, tributylaluminum, tris(2-methylpropyl)aluminum ("TiBAl"), tripentylaluminum, trihexylaluminum ("TnHAl"), trioctylaluminum, or a combination of any two or more thereof. In some aspects the trialkylaluminum is TiBAl. TiBAl is of formula $((CH_3)_2C(H)CH_2)_3Al$.

The spray-dried zirconocene catalyst system may be used in gas phase or liquid phase olefin polymerization reactions to enhance the rate of polymerization of monomer and/or comonomer(s). Liquid phase reactions include slurry phase and solution phase. In some aspects the olefin polymerization reaction is conducted in gas phase, alternatively liquid phase, alternatively slurry phase, alternatively solution phase. Conditions for gas phase and liquid phase olefin polymerization reactions are generally well-known. For illustration, conditions for gas phase olefin polymerization reactions are described below.

The polymerization may be conducted in a high pressure, liquid phase or gas phase polymerization reactor to yield the inventive polyethylene composition. Such reactors and methods are generally well-known in the art. For example, the liquid phase polymerization reactor/method may be solution phase or slurry phase such as described in U.S. Pat. No. 3,324,095. The gas phase polymerization reactor/method may employ stirred-bed gas-phase polymerization reactors (SB-GPP reactors) and fluidized-bed gas-phase polymerization reactors (FB-GPP reactors) and an induced condensing agent and be conducted in condensing mode polymerization such as described in U.S. Pat. Nos. 4,453,399; 4,588,790; 4,994,534; 5,352,749; 5,462,999; and 6,489,408. The gas phase polymerization reactor/method may be a fluidized bed reactor/method as described in U.S. Pat. Nos. 3,709,853; 4,003,712; 4,011,382; 4,302,566; 4,543,399; 4,882,400; 5,352,749; 5,541,270; EP-A-0 802 202; and Belgian Patent No. 839,380. These patents disclose gas phase polymerization processes wherein the polymerization medium is either mechanically agitated or fluidized by the continuous flow of the gaseous monomer and diluent. Other useful gas phase processes include series or multistage polymerization processes such as described in U.S. Pat. Nos. 5,627,242; 5,665,818; 5,677,375; EP-A-0 794 200; EP-B1-0 649 992; EP-A-0 802 202; and EP-B-634421.

(Co)polymerizing conditions. Any result effective variable or combination of such variables, such as catalyst composition; amount of reactant; molar ratio of two reactants; absence of interfering materials (e.g., $H_2O$ and $O_2$); or a process parameter (e.g., feed rate or temperature), step, or sequence that is effective and useful for the inventive copolymerizing method in the polymerization reactor(s) to give the inventive polyethylene composition.

At least one, alternatively each of the (co)polymerizing conditions may be fixed (i.e., unchanged) during production of the inventive polyethylene composition. Such fixed (co)polymerizing conditions may be referred to herein as steady-state (co)polymerizing conditions. Steady-state (co)polymerizing conditions are useful for continuously making embodiments of the inventive polyethylene composition having same polymer properties.

Alternatively, at least one, alternatively two or more of the (co)polymerizing conditions may be varied within their defined operating parameters during production of the inventive polyethylene composition in order to transition from the production of a first embodiment of the inventive polyethylene composition having a first set of polymer properties to a non-inventive polyethylene composition or to a second embodiment of the inventive polyethylene composition having a second set of polymer properties, wherein the first and second sets of polymer properties are different and are each within the limitations described herein for the inventive polyethylene composition. For example, all other (co)polymerizing conditions being equal, a higher molar ratio of $(C_3-C_{20})$alpha-olefin comonomer/ethylene feeds in the inventive method of copolymerizing produces a lower density of the resulting product inventive polyethylene composition. Transitioning from one set to another set of the (co)polymerizing conditions is permitted within the meaning of "(co)polymerizing conditions" as the operating parameters of both sets of (co)polymerizing conditions are within the ranges defined therefore herein. A beneficial consequence of the foregoing transitioning is that any described property value for the inventive polyethylene composition may be achieved by a person of ordinary skill in the art in view of the teachings herein.

The (co)polymerizing conditions for gas or liquid phase reactors/methods may further include one or more additives such as a chain transfer agent, a promoter, or a scavenging agent. The chain transfer agents are well known and may be alkyl metal such as diethyl zinc. Promoters are well known such as in U.S. Pat. No. 4,988,783 and may include chloroform, CFCl3, trichloroethane, and difluorotetrachloroethane. Scavenging agents may be a trialkylaluminum. Slurry or gas phase polymerizations may be operated free of (not deliberately added) scavenging agents. The (co)polymerizing conditions for gas phase reactors/polymerizations may further include an amount (e.g., 0.5 to 200 ppm based on all feeds into reactor) static control agents and/or one or more catalyst additives such as CA-300 from Univation Technologies, LLC, Houston, Tex., USA. A catalyst additive is a compound that attenuates or lessens activity of a catalyst and may be used with extra-active catalysts to maintain temperature or polymer production rate at a target level. Static control agents may be added to the gas phase reactor to inhibit formation or buildup of static charge.

The (co)polymerizing conditions may further include using molecular hydrogen to control final properties of the polyethylene composition. Such use of $H_2$ is generally described in Polypropylene Handbook 76-78 (Hanser Publishers, 1996). All other things being equal, using hydrogen can increase the melt flow rate (MFR) or melt index (MI) thereof, wherein MFR or MI are influenced by the concentration of hydrogen. A molar ratio of hydrogen to total monomer ($H_2$/monomer), e.g., hydrogen to ethylene ($H_2/C_2$) may be >0 to 0.1, alternatively from 0.0001 to 0.0050. A molar ratio of comonomer to ethylene (e.g., α-olefin/$C_2$ molar ratio, i.e., $C_x/C_2$ molar ratio) may be from 0.0001 to 0.10, alternatively 0.005 to 0.10, alternatively 0.15 to 0.050, alternatively 0.020 to 0.039.

The (co)polymerizing conditions may include a partial pressure of ethylene in the polymerization reactor(s) independently from 690 to 3450 kilopascals (kPa, 100 to 500 pounds per square inch absolute (psia), alternatively 1030 to 2070 kPa (150 to 300 psia), alternatively 1380 to 1720 kPa (200 to 250 psia), alternatively 1450 to 1590 kPa (210 to 230 psia), e.g., 1520 kPa (220 psia). 1.000 psia=6.8948 kPa.

In some aspects the gas-phase polymerization is conducted in a fluidized bed-gas phase polymerization (FB-GPP) reactor under relevant gas phase, fluidized bed polymerization conditions. Such conditions are any variable or combination of variables that may affect a polymerization reaction in the FB-GPP reactor or a composition or property of an ethylene/alpha-olefin copolymer product made thereby. The variables may include reactor design and size, catalyst composition and amount; reactant composition and amount; molar ratio of two different reactants; presence or absence of feed gases such as $H_2$, molar ratio of feed gases versus reactants, absence or concentration of interfering materials (e.g., $H_2O$), absence or presence of an induced condensing agent (ICA), average polymer residence time (avgPRT) in the reactor, partial pressures of constituents, feed rates of monomers, reactor bed temperature (e.g., fluidized bed temperature), nature or sequence of process steps, time periods for transitioning between steps. In performing an inventive method, variables other than that/those being described or changed by the inventive method may be kept constant.

Comonomer/ethylene gas molar ratio $C_x/C_2$ of comonomer and ethylene being fed into the FB-GPP reactor may be from 0.0001 to 0.1, alternatively 0.005 to 0.10, alternatively 0.15 to 0.050, alternatively 0.020 to 0.039.

Ethylene partial pressure in the FB-GPP reactor. From 690 to 2070 kilopascals (kPa, i.e., from 100 to 300 psia (pounds per square inch absolute)); alternatively from 830 to 1655 kPa (120 to 240 psia), alternatively from 1300 to 1515 kPa (190 to 220 psia). Alternatively, the partial pressure of ethylene may be from 690 to 3450 kilopascals (kPa, 100 to 500 pounds per square inch absolute (psia)), alternatively 1030 to 2070 kPa (150 to 300 psia), alternatively 1380 to 1720 kPa (200 to 250 psia), alternatively 1450 to 1590 kPa (210 to 230 psia), e.g., 1520 kPa (220 psia). 1.000 psia=6.8948 kPa.

Hydrogen to ethylene ($H_2/C_2$) gas molar ratios in the FB-GPP reactor may be from >0 to 0.1, alternatively from 0.0001 to 0.0050. In other embodiments the $H_2/C_2$ gas molar ratio in the FB-GPP reactor may be 0.0001 to 0.25, alternatively from 0.0005 to 0.200, alternatively from 0.005 to 0.149, alternatively from 0.009 to 0.109, alternatively from 0.010 to 0.100, alternatively from 0.0001 to 0.0050.

Reactor bed temperature in the FB-GPP reactor may be from 70° to 120° C., alternatively from 75° to 115° C., alternatively from 79° to 110° C., alternatively from 80.0° to 89° C.

Residence time, average for polymer (avgPRT). The number of minutes or hours on average the polymer product resides in the FB-GPP reactor. The avgPRT may be from 30 minutes to 10 hours, alternatively from 60 minutes to 5 hours, alternatively from 90 minutes to 4 hours, alternatively from 1.7 to 3.0 hours.

In some aspects any compound, composition, formulation, mixture, or reaction product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the compound, composition, formulation, mixture, or reaction product (e.g., Zr required by a zirconocene) are not excluded.

Density Test Method: measured according to ASTM D792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter (g/cm³).

Flow Index (190° C., 21.6 kg, "$FI_{21}$") Test Method: use ASTM D1238-13, *Standard Test Method for Melt Flow Rates of Thermoplastics by Extrusion Platometer*, using conditions of 190° C./21.6 kilograms (kg). Report results in units of grams eluted per 10 minutes (g/10 min.).

Gel permeation chromatography (GPC) Method: Weight-Average Molecular Weight Test Method: determine $M_w$, number average molecular weight ($M_n$), and $M_w/M_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 μm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (μL). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (μm) Teflon filter to give the solvent. Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate $M_w$ and $M_n$ using universal calibration relationships with the column calibrations. Calculate MW at each elution volume with following equation:

$$\log M_X = \frac{\log(K_X / K_{PS})}{a_X + 1} + \frac{a_{PS} - 1}{a_X + 1} \log M_{PS},$$

where subscript "X" stands for the test sample, subscript "PS" stands for PS standards, $a_{PS}$=0.67, $K_{PS}$=0.000175, and $a_X$ and $K_X$ are obtained from published literature. For polyethylenes, $a_X/K_X$=0.695/0.000579. For polypropylenes $a_X/K_X$=0.705/0.0002288. At each point in the resulting chromatogram, calculate concentration, c, from a baseline-subtracted DRI signal, $I_{DRI}$, using the following equation: c=$K_{DRI}I_{DRI}$/(dn/dc), wherein $K_{DRI}$ is a constant determined by calibrating the DRI, / indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0334] to [0341]. Plot of dW/dLog(MW) on the y-axis versus Log(MW) on the x-axis to give a GPC chromatogram, wherein Log(MW) and dW/dLog(MW) are as defined above.

Melt Index (190° C., 2.16 kilograms (kg), "$I_2$") Test Method: measured according to ASTM D1238-13, using conditions of 190° C./2.16 kg, formerly known as "Condition E" and also known as $I_2$. Report results in units of grams eluted per 10 minutes (g/10 min.).

Ethylene ("$C_2$"): a monomer; used at the partial pressure of $C_2$ described below.

1-hexene ("$C_6$"): a comonomer; used at the molar ratio of $C_6/C_2$ described below.

Molecular hydrogen gas ("$H_2$"): used at a molar ratio of $H_2/C_2$ described below.

Inventive Example 1 (IE1): spray-dried Zirconocene Catalyst System 1 (iZr1). Charge 18.1 kilograms (kg) of anhydrous toluene into a stirred reactor A (reactor A). Then add 10.9 kg of a 10 wt % solution of methylalumoxane (MAO) in toluene to reactor A. Next, 1.63 kg of CAB-O-SIL® TS-610 is charged to reactor A and the slurry is mixed overnight. While stirring the resulting slurry at ambient temperature, add 221 g of a 23.9 wt % solution of bis(1-methyl-3-butylcyclopentadienyl)zirconium dichloride. Continue mixing contents of reactor A for 60 minutes. The above slurry was then spray-dried using a pilot scale spray dryer. The slurry was fed to the spray-dryer at a feed rate of 120 pounds per hour. The atomizer speed was maintained at 90%. The outlet temperature at the condenser was maintained at about 80° C. and the inlet temperature was maintained at about 160° C. The final spray-dried catalyst composition had a zirconium loading of 0.46 wt %, an aluminum loading of 15.5 wt % and 2.6 wt % residual toluene.

Inventive Example 2 (IE2): spray-dried Zirconocene Catalyst System 2 (iZr2). Charge 18.1 kg of anhydrous toluene into a stirred reactor A (reactor A). Then add 10.9 kg of a 10 wt % solution of methylalumoxane (MAO) in toluene to reactor A. Next, 1.63 kg of CAB-O-SIL® TS-610 is charged to reactor A and the slurry is mixed overnight. While stirring the resulting slurry at ambient temperature, add 55.9 g of dimethyl-1,1'-silanylene-bridged bis(4,5,6,7-tetrahydroindenyl)zirconium dichloride. Continue mixing contents of reactor A for 60 minutes. The above slurry was then spray-dried using a pilot scale spray dryer. The slurry was fed to the spray-dryer at a feed rate of 120 pounds per hour. The atomizer speed was maintained at 90%. The outlet temperature at the condenser was maintained at about 80° C. and the inlet temperature was maintained at about 160° C. The final spray-dried catalyst composition had a zirconium loading of 0.42 wt %, an aluminum loading of 15.9 wt % and 3.2 wt % residual toluene Comparative Example 1 (CE1): Zirconocene Catalyst System 1 (ceZr1). Made from bis(1-methyl 3-n-butylcyclopentadienyl)zirconium dichloride or dimethyl, supplied by Univation Technologies, Inc., was utilized for this example.

Comparative Example 2 (CE2): spray-dried zirconocene catalyst on porous silica (ceZr2). Charge 7.7 kg of anhydrous toluene into a stirred reactor (reactor A). Then add 8.5 kg of a 10 wt % solution of methylalumoxane (MAO) in toluene into reactor A. Next, charge 245 g of a 23.9 wt % solution of bis(1-methyl-3-butylcyclopentadienyl)zirconium dichloride in toluene into reactor A. Mix the slurry. In a separate reactor (reactor B), combine and mix 2.2 kg of SYLOPOL® 948 silica that has been previously calcined at 600° C. and 7.7 kg toluene. Then charge the premixed solution of reactor A into reactor B, and mix the slurry for one hour. Next, charge 160 g of Additive B into the slurry in reactor B, and mix the resultant slurry for 30 minutes. Spray-dry the slurry using a pilot scale spray dryer having a condenser. Feed the slurry to the spray-dryer at a feed rate of 45 kg per hour. Maintain atomizer speed at 90%, outlet temperature at the condenser at about 99° C., and inlet temperature at about 165° C. to give ceZr2. The ceZr2 has a Zr loading of 0.44 wt %, an Al loading of 10.8 wt % and 2.8 wt % residual toluene.

Comparative Example 3 (CE3): zirconocene catalyst on porous silica (ceZr3); not spray-dried. Made from zirconium procatalyst of formula (III) dimethyl-1,1'-silanylene-bridged bis(4,5,6,7-tetrahydroindenyl)zirconium dichloride, supplied by Univation Technologies, Inc., was utilized for this example. The ceZr3 has a Zr loading of 0.34 wt %, an Al loading of 12.8 wt % and approximately 1.5 wt % wt % residual toluene.

Inventive Example A (IE(A)): Gas phase fluidized bed copolymerization of ethylene and 1-hexene catalyzed by the spray-dried zirconocene catalyst system iZr1 of IE1 to give an ethylene/1-hexene copolymer composition with nominal targets of 1.0 MI and 0.918 g/cm$^3$ density. Used a gas phase fluidized bed reactor has 0.35 meter (m) internal diameter and 2.3 m bed height and fluidized bed composed of polymer granules. Introduce gaseous feed streams of ethylene and hydrogen together with 1-hexene comonomer introduced below the reactor bed into a recycle gas line. Control individual flow rates of ethylene, hydrogen and 1-hexene to maintain fixed composition targets and control ethylene concentration to maintain a constant ethylene partial pressure. Control hydrogen to maintain constant hydrogen to ethylene ($H_2/C_2$) molar ratio. Measure concentrations of all gasses using an on-line gas chromatograph. Maintain the fluidized bed at constant height by withdrawing a portion of the bed at a rate equal to the rate of formation of particulate product. Obtain polymer production rate in the range of 15 to 25 kg/hour. Remove product semi-continuously via a series of valves into a fixed volume chamber. Purge removed product to remove any entrained hydrocarbons, and treat with a small stream of humidified nitrogen to deactivate any trace quantities of residual catalyst and cocatalyst. For IE(A), disperse the solid catalyst in degassed and dried mineral oil as a nominal 18 wt % slurry, and inject the slurry directly into the fluidized bed using purified nitrogen and isopentane as carriers. Control relative feed rate of the catalyst to achieve a targeted polymer production rate while also maintaining reaction temperature and the gas compositions in the reactor to achieve targeted polymer properties. Maintain reacting bed of growing polymer particles in a fluidized state by continually flowing the makeup feed and recycle gas through the reaction zone at a superficial gas velocity in about the range of 0.64 to 0.64 m/s. Operate the reactor at a total pressure of about 2413 kPA gauge. Maintain a constant fluidized bed temperature by continuously adjusting the temperature of the recycle gas up or down by passing the recycle gas through a shell-and-tube heat exchanger with cooling water on the shell-side. In the example of IE(A), feed a slurry mixture containing 20 wt % of catalyst additive CA-300 in degassed and dried mineral oil into reactor using isopentane as carrier. Feed CA-300 at a rate to maintain about 30 ppmw of CA-300 in the polymer product, wherein ppmw here is catalyst additive flow rate in kg/hour times (x) its concentration in wt % divided by reactor production rate of polymer in kg/hour.

Inventive Example B (IE(B)): Replicate the procedure of IE(A) except adjust the reactor operating conditions to give an ethylene/1-hexene copolymer composition with nominal target of 1.0 MI and 0.912 g/cm$^3$ density.

Inventive Example C (IE(C)): Replicate the procedure of IE(A) except replace iZr1 with iZr2 of IE2 and adjust the reactor operating conditions to give an ethylene/1-hexene copolymer composition with nominal target of 1.0 MI and 0.9196 g/cm$^3$ density.

Comparative Example A (CE(A)): replicate the procedure of IE(A) except replace the spray-dried zirconocene catalyst system iZr1 of IE(1) with the comparative zirconocene catalyst system ceZr1 of CE1. In the example of CE(A), catalyst was fed to the reactor as a dry powder using a nitrogen carrier flow to disperse the catalyst into the fluidized bed and no catalyst additive (e.g., no CA-300) was added to the reactor.

Comparative Example B (CE(B)): replicate the procedure of IE(A) except replace the spray-dried zirconocene catalyst system iZr1 of IE(1) with the comparative spray-dried zirconocene catalyst system ceZr2 of CE2. In the example of CE(B), fed catalyst to the reactor as a dry powder using a nitrogen carrier flow to disperse the catalyst into the fluidized bed. Do not add catalyst additive (e.g., no CA-300) to the reactor.

Comparative Example C (CE(C)): replicate the procedure of IE(A) except replace catalyst system iZr1 of IE(1) with the comparative catalyst system ceZr1 of CE1 and adjust reactor operating conditions to give an ethylene/1-hexene copolymer composition with nominal target of 1.0 MI and 0.912 g/cm$^3$ density. Feed catalyst into the reactor as a dry powder using a nitrogen carrier flow to disperse the catalyst into the fluidized bed. Do not add catalyst additive (e.g., no CA-300) to the reactor.

Comparative Example D (CE(D)): replicate the procedure of IE(A) except replace iZr1 of IE(1) with the comparative spray-dried zirconocene catalyst system ceZr3 of CE3. In the example of CE(D), fed catalyst to the reactor as a dry powder using a nitrogen carrier flow to disperse the catalyst into the fluidized bed.

Ex. No. is Example Number; sdCat. Sys. is spray-dried zirconium catalyst system; wt % is weight percent; cm$^3$/hour is cubic centimeters per hour; kg is kilogram; m/s is meter per second; kPa is kilopascals; mol is mole and mol/mol is mole per mole; $C_2$ is ethylene; $C_6$ is 1-hexene; $H_2$ is molecular hydrogen gas; Mw is weight-average molecular weight as determined by GPC as described earlier; g is grams; g/cm$^3$ is gram per cubic centimeter; N/d is not determined; g/10 min. is grams per 10 minutes; Cat. Prod. (wt. PE/wt. Cat.) is weight of product polymer made per weight of catalyst system used; cm is centimeter. ICP is inductively-coupled plasma. The ppm/mol % in relation to $H_2/C_2$ ratio is $H_2$ concentration in parts per million by weight in ethylene ($C_2$) concentration in mole %.

TABLE 1

Catalyst features in Gas Phase Polymerizations

| Ex. No. | IE(A) and IE(B) | CE(A) and CE(C) | CE(B) |
|---|---|---|---|
| Catalyst System | iZr1 | ceZr1 | ceZr2 |
| Zr loading | 0.46 wt % | 0.40 wt % | 0.44 wt % |
| Al loading | 15.5 wt % | 12.3 wt % | 10.8 wt % |

As shown in Table 1, iZr1 of IE1 and IE(A) has a comparable zirconium loading, by ICP analysis, to that of ceZr1 and ceZr2 of CE1 and CE2, respectively. iZr1 of IE1 and IE(A) has a higher Al loading that of ceZr1 and ceZr2. Without wishing to be bound by theory, the higher level of Al loading is achievable using the inventive spray-drying method in combination with a fumed silica filler (CAB-O-SIL® TS-610), as opposed to the porous silica carrier of the comparative examples, and may enhance overall catalyst productivity.

TABLE 2

Gas Phase Polymerization Process Conditions

| Ex. No. | IE(A) | CE(A) | CE(B) |
|---|---|---|---|
| Cat. Feed Rate | 1.0 g/hour | 2.9 g/hour | 2.8 g/hour |
| Catalyst Additive | CA-300 (20 wt %) | None | None |
| Reactor Bed Weight | 37.2 kg | 45.0 kg | 45.3 kg |
| Reactor Bed Temp. | 85.0° C. | 85.0° C. | 85.0° C. |
| Reactor Superficial gas velocity | 0.55 m/s | 0.64 m/s | 0.58 m/s |
| Ethylene ("$C_2$") partial pressure | 1,380 kPa | 1,380 kPa | 1,378 kPa |
| 1-hexene/ethylene ("$C_6/C_2$") ratio | 0.0270 mol/mol | 0.0240 mol/mol | 0.0235 mol/mol |
| $H_2/C_2$ molar ratio | 0.0003 mol/mol | 0.0002 mol/mol | 0.0002 mol/mol |
| $H_2/C_2$ ppm/mol % ratio | 3.51 | 2.45 | 2.40 |
| Isopentane (ICA) | 10 to 11 mol % | 3 mol % | 3 mol % |
| Residence time | 2.6 hours | 3.0 hours | 2.8 hours |

In Table 2, the gas phase process conditions are similar for both the inventive and comparative examples. Reactor catalyst additive, CA-300 (at a target of 30 ppmw based on bed weight), was used with iZr1 of IE1, whereas CE(A) and CE(B) did not require CA-300.

TABLE 3

Product Polymer Properties from Gas Phase Polymerizations

| Ex. No. | IE(A) | CE(A) | CE(B) |
|---|---|---|---|
| Density | 0.9181 g/cm$^3$ | 0.9180 g/cm$^3$ | 0.9178 g/cm$^3$ |
| $M_w$ (Da) | 117,662 | 113,971 | 114,676 |
| $M_n$ (Da) | 45,788 | 44,287 | 42,726 |
| $M_z$ (Da) | 337,458 | 210,151 | 213,835 |
| MWD ($M_w/M_n$) | 2.57 | 2.57 | 2.68 |
| Melt Index ($I_2$) | 1.1 g/10 min. | 1.0 g/10 min. | 1.0 g/10 min. |
| Flow Index ($I_5$) | 2.8 g/10 min. | 2.6 g/10 min. | 2.5 g/10 min. |
| Flow Rate ($I_{21}$) | 17.5 g/10 min. | 16.3 g/10 min. | 15.7 g/10 min. |
| Melt flow ratio ($I_{21}/I_2$) | 16.1 | 15.9 | 15.8 |
| PE settled bulk density (SBD) | 452 kg/m$^3$ | 410 kg/m$^3$ | 503 kg/m$^3$ |
| PE fluidized bulk density (FBD) | 208 kg/m$^3$ | 240 kg/m$^3$ | 259 kg/m$^3$ |
| PE Average Particle Size | 0.070 cm. | 0.097 cm. | 0.068 cm. |

In Table 3, product properties for the inventive product are similar to those of the comparative product except for the unexpectedly high z-average molecular weight ($M_z$) of IE(A) relative to $M_z$ of CE(A) and CE(B).

TABLE 4

Catalyst/Process Characteristics from Gas Phase Polymerizations

| Ex. No. | IE(A) | CE(A) | CE(B) |
|---|---|---|---|
| Cat. Productivity (wt. PE/wt. Cat.) | 15,200 | 5,200 | 5,800 |

In Table 4, inventive spray-dried zirconocene catalyst system iZr1 and related gas phase polymerization methods produced ethylene/alpha-olefin copolymer compositions with beneficially greater (approximately 2.5× greater) catalyst productivity compared to catalyst productivity of the comparative catalyst system ceZr1 and methods.

TABLE 5

Product Polymer Properties from Gas Phase Polymerizations

| | Peak Temp of Each Zone (° C.) | | | Wt % of Each Zone | | |
|---|---|---|---|---|---|---|
| | Zone 1 | Zone 2 | Zone 3 | Zone 1 | Zone 2 | Zone 3 |
| IE (A) | 29.32 | 87.01 | 0.00 | 0.0042 | 0.9958 | 0 |
| CE (A) | 28.85 | 87.24 | 95.88 | 0.0069 | 0.8169 | 0.1763 |
| CE (B) | 28.68 | 87.58 | 96.36 | 0.0079 | 0.8457 | 0.1464 |

Table 5 shows numerical data on the short chain branching distribution by Crystallization Elution Chromatography (CEF). IE(A) shows a significantly higher weight fraction in Zone 2 relative to CE(A) and CE(B), suggesting IE(A) has a narrower short chain branching (SCB) distribution, which is beneficial for inventive film properties.

TABLE 6

Product Polymer Properties from Gas Phase Polymerizations

| Frequency | Viscosity [pa-sec] | | |
|---|---|---|---|
| (rad/sec) | IE(A) | CE(A) | CE(B) |
| 0.1 | 6,933 | 6,581 | 6,655 |
| 1 | 6,207 | 6,270 | 6,329 |
| 10 | 4,854 | 5,028 | 5,026 |
| 100 | 2,364 | 2,420 | 2,384 |
| Viscosity 0.1/100 | 2.9 | 2.7 | 2.8 |
| Tan delta 0.1 | 13.4 | 37.7 | 33.1 |

Table 6 summarizes low shear rate melt rheology data of the samples, measured by Dynamic Mechanical Spectroscopy (DMS). IE(A) produced by the spray-dried iZr1 of IE1 is more shear sensitive compared to CE(A) and CE(B), as shown by the higher viscosity at low shear rate and lower viscosity at higher shear rates. This behavior for IE(A) is also reflected in the higher viscosity ratio (viscosity at 0.1 rad/s over that at 100 rad/s) and lower tan delta (or lower elasticity). The higher viscosity at very low shear rate (0.1 rad/sec) seen with IE(A) is consistent with the unexpectedly $M_z$ for IE(A) shown in Table 3.

TABLE 7

Gas Phase Polymerization Process Conditions

| Ex. No. | IE(B) | CE(C) |
|---|---|---|
| Cat. Feed Rate | 0.8 g/hour | 2.2 g/hour |
| Catalyst Additive | CA-300 (20 wt %) | None |
| Reactor Bed Weight | 37.2 kg | 44.4 kg |
| Reactor Bed Temp. | 85.0° C. | 85.0° C. |
| Reactor Superficial gas velocity | 0.55 m/s | 0.64 m/s |
| Ethylene ("C$_2$") partial pressure | 1,380 kPa | 1,380 kPa |
| 1-hexene/ethylene ("C$_6$/C$_2$") ratio | 0.0345 mol/mol | 0.0310 mol/mol |
| H$_2$/C$_2$ molar ratio | 0.0004 mol/mol | 0.0003 mol/mol |
| H$_2$/C$_2$ ppm/mol % ratio | 4.00 | 2.75 |
| Isopentane (ICA) | 10 to 11 mol % | 3 mol % |
| Residence time | 2.9 hours | 2.9 hours |

In Table 7, the gas phase process conditions are similar for both the inventive and comparative examples. Reactor catalyst additive, CA-300 (at a target of 30 ppmw based on bed weight) used for IE(B) helped mitigate potential operability issues associated with the high activity observed with iZr1 of IE1, whereas CE(C) did not require CA-300.

TABLE 8

Product Polymer Properties from Gas Phase Polymerizations

| Ex. No. | IE(B) | CE(C) |
|---|---|---|
| Density | 0.9121 g/cm³ | 0.9127 g/cm³ |
| $M_w$ (Da) | 114,867 | 115,437 |
| $M_n$ (Da) | 49,926 | 46,729 |
| $M_z$ (Da) | 221,904 | 208,752 |
| MWD ($M_w/M_n$) | 2.30 | 2.47 |
| Melt Index (I$_2$) | 1.0 g/10 min. | 1.0 g/10 min. |
| Flow Index (I$_5$) | 2.6 g/10 min. | 2.5 g/10 min. |
| Flow Rate (I$_{21}$) | 17.5 g/10 min. | 16.3 g/10 min. |
| Melt flow ratio (I$_{21}$/I$_2$) | 16.3 | 15.7 |
| PE settled bulk density (SBD) | 436 kg/m³ | 415 kg/m³ |
| PE fluidized bulk density (FBD) | 215 kg/m³ | 247 kg/m³ |
| PE Average Particle Size | 0.078 cm. | 0.105 cm. |

In Table 8, properties of inventive product are similar to those of comparative product with the exception of the unexpectedly narrow MWD of IE(B) relative to CE(C).

TABLE 9

Catalyst/Process Characteristics from Gas Phase Polymerizations

| Ex. No. | IE(B) | CE(C) |
|---|---|---|
| Cat. Productivity (wt. PE/wt. Cat.) | 17,500 | 6,900 |

In Table 9, inventive spray-dried zirconocene catalyst systems iZr1 of IE1 and IE(B) produced ethylene/alpha-olefin copolymer compositions with beneficially greater (approximately 2.5× greater) catalyst productivity compared to catalyst productivity of the comparative catalyst system ceZr1 of CE1 and CE(C).

TABLE 10

Product Polymer Properties from Gas Phase Polymerizations

| | Peak Temp of Each Zone (° C.) | | | Wt % of Each Zone | | |
|---|---|---|---|---|---|---|
| | Zone 1 | Zone 2 | Zone 3 | Zone 1 | Zone 2 | Zone 3 |
| IE (B) | 28.88 | 80.08 | 0.00 | 0.0053 | 0.9947 | 0 |
| CE (C) | 28.29 | 79.49 | 95.80 | 0.0079 | 0.9128 | 0.0793 |

Table 10 shows numerical data on the short chain branching distribution by Crystallization Elution Chromatography (CEF). IE(B) shows a significantly higher weight fraction in Zone 2 relative to CE(C), suggesting IE(B) has narrower SCB distribution, beneficial for films.

TABLE 11

Product Polymer Properties from Gas Phase Polymerizations

| Frequency | Viscosity [pa-sec] | |
|---|---|---|
| (rad/sec) | IE(B) | CE(C) |
| 0.1 | 6,995 | 7,026 |
| 1 | 6,499 | 6,712 |
| 10 | 5,165 | 5,320 |
| 100 | 2,483 | 2,487 |
| Viscosity 0.1/100 | 2.8 | 2.8 |
| Tan delta 0.1 | 21.5 | 36.5 |

Table 11 summarizes the low shear rate melt rheology data of the samples measured by DMS. IE(B) and CE(C) show similar sheer sensitivity. IE(B) shows a lower tan delta, suggesting lower elasticity.

TABLE 12

Catalyst features in Gas Phase Polymerizations.

| Ex. No. | IE(C) | CE(D) |
|---|---|---|
| Catalyst System | iZr2 | ceZr3 |
| Zr loading | 0.42 wt % | 0.34 wt % |
| Al loading | 15.9 wt % | 12.8 wt % |

As shown in Table 12, iZr2 of IE4 and IE(C) has a comparable zirconium loading and a comparable Al loading, both by ICP analysis, to those of ceZr3 of CE3.

TABLE 13

Gas Phase Polymerization Process Conditions.

| Ex. No. | IE(C) | CE(D) |
|---|---|---|
| Cat. Feed Rate | 1.9 g/hour | 3.4 g/hour |
| Catalyst Additive | CA-300 | CA-300 |
|  | (20 wt %) | (20 wt %) |
| Reactor Bed Weight | 69.7 kg | 83.3 kg |
| Reactor Bed Temp. | 85.0° C. | 85.0° C. |
| Reactor Superficial gas velocity | 0.58 m/s | 0.55 m/s |
| Ethylene ("$C_2$") partial pressure | 1,380 kPa | 1,380 kPa |
| 1-hexene/ethylene ("$C_6/C_2$") ratio | 0.0113 mol/mol | 0.0120 mol/mol |
| $H_2/C_2$ molar ratio | 0.0014 mol/mol | 0.0013 mol/mol |
| $H_2/C_2$ ppm/mol % ratio | 14.17 | 12.96 |
| Isopentane (ICA) | 6 mol % | 3 mol % |
| Residence time | 3.3 hours | 3.2 hours |

In Table 13, the gas phase process conditions are similar for both the inventive example IE(C) and comparative example CE(D).

TABLE 14

Product Polymer Properties from Gas Phase Polymerizations.

| Ex. No. | IE(C) | CE(D) |
|---|---|---|
| Density | 0.9196 g/cm³ | 0.9196 g/cm³ |
| $M_w$ (Da) | 89,179 | 91,035 |
| $M_n$ (Da) | 30,691 | 25,941 |
| $M_z$ (Da) | 200,600 | 233,435 |
| MWD ($M_w/M_n$) | 2.91 | 3.51 |
| Melt Index ($I_2$) | 1.0 g/10 min. | 0.9 g/10 min. |
| Flow Index ($I_5$) | 3.8 g/10 min. | 3.2 g/10 min. |
| Flow Rate ($I_{21}$) | 40.1 g/10 min. | 33.6 g/10 min. |
| Melt flow ratio ($I_{21}/I_2$) | 38.1 | 36.7 |
| PE settled bulk density (SBD) | 514 kg/m³ | 488 kg/m³ |
| PE fluidized bulk density (FBD) | 274 kg/m³ | 340 kg/m³ |
| PE Average Particle Size | 0.047 cm. | 0.085 cm. |

In Table 14, product properties for the inventive product are similar to those of the comparative product except for the unexpectedly lower molecular weight distribution for IE(C) versus CE(D).

TABLE 15

Catalyst/Process Characteristics from Gas Phase Polymerizations.

| Ex. No. | IE(C) | CE(D) |
|---|---|---|
| Cat. Productivity (wt. PE/wt. Cat.) | 10,600 | 7,800 |

In Table 15, inventive spray-dried zirconocene catalyst system iZr2 and related gas phase polymerization methods produced ethylene/alpha-olefin copolymer compositions with beneficially greater (approximately 1.4 times greater) catalyst productivity compared to catalyst productivity of the comparative catalyst system ceZr3 and methods.

The invention claimed is:

1. A spray-dried zirconocene catalyst system consisting essentially of a zirconocene catalyst and a hydrophobic fumed silica, which supports the zirconocene catalyst, wherein the zirconocene catalyst of the spray-dried zirconocene catalyst system is made from a reaction of an activator and a zirconocene procatalyst of formula (I): (($R^1$)$_x$-cyclopentadienyl)(($R^2$)$_y$-cyclopentadienyl)zirconium dichloride/dibromide/dialkyl (I), wherein subscript x is an integer from 1 to 5; subscript y is an integer from 0 to 5; and each $R^1$ and $R^2$ independently is methyl, ethyl, a normal-($C_3$-$C_{10}$)alkyl (linear), or an iso-($C_3$-$C_{10}$)alkyl.

2. The spray-dried zirconocene catalyst system of claim 1, wherein subscript x is 2 and subscript y is 2; and each $R^1$ and $R^2$ independently is methyl, ethyl, or a normal-($C_3$-$C_{10}$)alkyl (linear).

3. The spray-dried zirconocene catalyst system of claim 1 wherein the zirconocene procatalyst of formula (I) is selected from bis(1-methyl-3-butylcyclopentadienyl)zirconium dichloride, bis(1-methyl-3-butylcyclopentadienyl)zirconium dibromide, and bis(1-methyl-3-butylcyclopentadienyl)zirconium dimethyl.

4. The spray-dried zirconocene catalyst system of claim 1 made by mixing the activator, the zirconocene procatalyst of formula (I), and the hydrophobic fumed silica in a hydrocarbon solvent to make a suspension of the hydrophobic fumed silica in a solution of the zirconocene catalyst, which is made in situ, in the hydrocarbon solvent; and spray-drying the suspension to give the spray-dried zirconocene catalyst system.

5. The spray-dried zirconocene catalyst system of claim 1 wherein the hydrophobic fumed silica is made by contacting an untreated fumed silica, having surfaces containing silicon-bonded hydroxyl groups, with a silicon-based hydrophobing agent, containing on average per molecule one or more functional groups reactive with a SiOH group, to give the hydrophobic fumed silica.

6. The spray-dried zirconocene catalyst system of claim 1 wherein the activator is an alkylaluminoxane.

7. A method of making a spray-dried zirconocene catalyst system, the method comprising contacting in a hydrocarbon solvent an activator with a zirconocene procatalyst of formula (I) as defined in claim 1, and a hydrophobic fumed silica to give a suspension of the hydrophobic fumed silica in a solution of the zirconocene catalyst, which is made in situ, in the hydrocarbon solvent, and then spray-drying the suspension to give the spray-dried zirconocene catalyst system.

8. A method of making a polyethylene composition, the method comprising contacting ethylene and optionally one, or more ($C_3$-$C_{20}$)alpha-olefin with the spray-dried zirconocene catalyst system of claim 1 in a polymerization reactor to generate a polymerization reaction giving a polyethylene composition comprising a polyethylene homopolymer or ethylene/($C_3$-$C_{20}$)alpha-olefin copolymer, respectively, and the spray-dried zirconocene catalyst system, or a by-product thereof.

* * * * *